(12) United States Patent
Garnier et al.

(10) Patent No.: US 7,651,164 B2
(45) Date of Patent: Jan. 26, 2010

(54) ADJUSTMENT MECHANISM AND A VEHICLE SEAT INCLUDING SUCH A MECHANISM

(75) Inventors: Mickaël Garnier, Flers (FR); Jérôme Bosse, Le Sap (FR)

(73) Assignee: Faurecia Sieges d'Automobile, Nanterre (FR)

( * ) Notice: Subject to any disclaimer, the term of this patent is extended or adjusted under 35 U.S.C. 154(b) by 314 days.

(21) Appl. No.: 11/399,705

(22) Filed: Apr. 5, 2006

(65) Prior Publication Data

US 2006/0278774 A1  Dec. 14, 2006

(30) Foreign Application Priority Data

Apr. 13, 2005  (FR) .................................. 05 03687

(51) Int. Cl.
*B60N 2/16* (2006.01)
(52) U.S. Cl. .............................. 297/344.12; 192/223.2; 192/19
(58) Field of Classification Search .......... 192/223.1–4, 192/19, 15, 112, 223.2; 297/362; 74/89.18, 74/392, 396
See application file for complete search history.

(56) References Cited

U.S. PATENT DOCUMENTS

| | | | |
|---|---|---|---|
| 5,435,624 A * | 7/1995 | Bray et al. ............. | 297/362.11 |
| 5,896,973 A | 4/1999 | Hochmuth et al. | |
| 6,212,965 B1 | 4/2001 | Hochmuth | |
| 6,238,886 B1 * | 5/2001 | Patel et al. ................. | 435/69.2 |
| 6,273,233 B1 | 8/2001 | Denis | |
| 6,371,557 B1 * | 4/2002 | Holloway ................... | 297/367 |
| 6,481,557 B2 * | 11/2002 | Denis ....................... | 192/223.2 |
| 6,488,134 B2 * | 12/2002 | Becker et al. ................. | 192/19 |
| 6,508,347 B1 * | 1/2003 | Hochmuth ................... | 192/44 |
| 6,637,575 B2 * | 10/2003 | Liu et al. ................. | 192/223.2 |
| 6,641,215 B2 * | 11/2003 | Rohee ................... | 297/344.12 |
| 7,225,697 B2 * | 6/2007 | Schalk et al. ................. | 74/405 |
| 2002/0059844 A1 | 5/2002 | Leung | |
| 2003/0001418 A1 * | 1/2003 | Baloche et al. ........ | 297/344.12 |
| 2005/0155836 A1 * | 7/2005 | Liu .......................... | 192/223.2 |

FOREIGN PATENT DOCUMENTS

| | | |
|---|---|---|
| DE | 32 05 443 | 8/1983 |
| DE | 3321004 C1 * | 11/1984 |
| EP | 1 084 898 A2 | 3/2001 |
| FR | 2 826 320 A1 | 12/2002 |
| JP | 2004-092718 | 3/2004 |

OTHER PUBLICATIONS

French Preliminary Search Report FR 0503687; report dated Dec. 13, 2005.
English Translation of first Japanese Office Action in counterpart Japanese Application No. 2006-109632, action dated Jan. 20, 2009.

* cited by examiner

*Primary Examiner*—Richard M. Lorence
(74) *Attorney, Agent, or Firm*—Miller, Matthias & Hull (57) ABSTRACT

An adjustment mechanism comprising a casing, an inlet member that is moveable relative to the casing; an outlet sprocket provided with a circular set of teeth and mounted to pivot in first and second bearings that are secured to or integral with the casing and that flank the outlet sprocket, said outlet sprocket being connected to the inlet member via a transmission device contained in the casing. The casing is provided with at least one side opening facing the set of teeth on the outlet sprocket, so as to enable said outlet sprocket to mesh with an external member.

12 Claims, 4 Drawing Sheets

ADJUSTMENT MECHANISM AND A VEHICLE SEAT INCLUDING SUCH A MECHANISM

The present invention relates to adjustment mechanisms, and to vehicle seats including such mechanisms.

FIELD OF THE INVENTION

More particularly, the invention relates to an adjustment mechanism comprising:
a casing;
an inlet member that is moveable relative to the casing;
an outlet sprocket provided with a circular set of teeth and mounted to pivot in first and second bearings that are secured to or integral with the casing, said outlet sprocket being connected to the inlet member via a transmission device contained in the casing.

BACKGROUND OF THE INVENTION

Document FR-A-2 826 320 describes such an adjustment mechanism that is entirely satisfactory.

OBJECTS AND SUMMARY OF THE INVENTION

A particular object of the present invention is to improve mechanisms of this type still further, in particular so as to improve the guiding of the shaft that carries the outlet member.

To this end, in accordance with the invention, in an adjustment mechanism of the type in question, the first and second bearings flank the outlet sprocket, and the casing is provided with at least one side opening facing the set of teeth on the outlet sprocket, said side opening being adapted to enable said outlet sprocket to mesh with an external member.

In preferred embodiments of the invention, it is possible optionally also to use one or more of the following provisions:
the casing includes a base provided with a stamped-out dished portion in which the set of teeth of the sprocket is received, said base being provided with said side opening;
the stamped-out dished portion of the base has a side wall that is substantially parallel to the pivot axis and an end wall substantially perpendicular to the pivot axis, said side opening being provided in the side wall;
the set of teeth of the outlet sprocket project laterally out of said side wall via said side opening and the end wall covers the set of teeth of the outlet sprocket at least in part in the axial direction at said side opening;
the second bearing comprises a cylindrical wall formed in the end wall of the stamped-out dished portion;
the stamped-out dished portion is internally covered at least in part by a lining part;
the casing includes a cover fastened to the base, and the first bearing is formed by a ring secured to or integral with the cover;
the inlet member is mounted to pivot relative to the casing about a pivot axis, said inlet member being urged resiliently towards a rest position and being moveable in a first direction from the rest position, over a first angular sector, and in a second direction opposite from the first direction from the rest position, over a second angular sector, and the adjustment mechanism further comprises:

2 an intermediate member mounted to pivot about the pivot axis;
a drive stage connecting the inlet member to the intermediate member and adapted for:
positively driving the intermediate member with the inlet member via at least one drive member when the inlet member is moved away from the rest position; and
moving the drive member with the inlet member when said inlet member is returned to its rest position with the drive member rubbing against the intermediate member;
a blocking surface which is integral with or secured to the casing and which is circularly symmetrical about the pivot axis;
an outlet cam which is secured to the outlet sprocket and which is shaped to co-operate with the blocking surface to define at least one pair of wedge-shaped spaces comprising first and second hollow wedge-shaped spaces, the first and second wedge-shaped spaces diverging respectively in the first angular direction and in the second angular direction; and
a locking stage connecting the intermediate member to the outlet cam, said locking stage comprising:
at least one pair of clamping bodies comprising first and second rigid clamping bodies which are disposed in respective ones of the first and second wedge-shaped spaces and which are resiliently urged in respective ones of the first and second angular directions so as to become wedged between the outlet member and the blocking surface;
at least first and second rigid abutment faces secured to or integral with the intermediate member and which face in respective ones of the first and second angular directions, the first abutment face being adapted to abut against the first clamping body while releasing it when the intermediate member turns in the first angular direction, and the second abutment face being adapted to abut against the second clamping body while releasing it when the intermediate member turns in the second angular direction, the first and second abutment faces having a certain amount of angular clearance relative to the first and second clamping bodies; and
at least first and second thrust faces which are secured to or integral with the outlet cam, the first thrust face being adapted to limit the relative movement of the intermediate member relative to the outlet cam in the first angular direction after said abutment face has moved the first clamping body far enough to release it, so as then to cause said outlet cam to be driven by the intermediate member, and the second thrust face being adapted to limit the relative movement of the intermediate member relative to the outlet cam in the second angular direction after said second abutment face has moved the second clamping body far enough to release it, so as then to cause said outlet cam to be driven by the intermediate member (in particular by direct contact with abutments on the intermediate member or indeed by the clamping bodies abutting against the thrust faces while the abutment faces of the intermediate member are moving said clamping bodies);
the first and second clamping bodies of each pair of clamping bodies are urged apart by a compression spring and they are flanked by a pair of axial fingers comprising first and second axial fingers that are secured to or integral with the intermediate member, the first and second axial fingers having respective ones of the first and second abutment faces, the first thrust face of the outlet member being adapted to abut against the second axial finger of the intermediate member when said intermediate member moves in the first angular direction, and the second thrust face of the outlet member being adapted to abut against the first axial finger of the intermediate member when said intermediate member moves in the second angular direction;

the drive stage comprises:

an abutment surface that is secured to or integral with the intermediate member, which abutment surfaces is circularly symmetrical about the pivot axis and, together with the inlet member, radially defines a hollow intermediate annular space, the inlet member being provided with at least one projection which projects into said intermediate annular space and which defines first and second wedge-shaped zones in said intermediate annular space, said first and second wedge-shaped zones diverging in respective ones of the first and second angular directions;

a pair of wedging bodies comprising first and second rigid wedging bodies which are disposed in the intermediate annular space and which are urged resiliently towards the first and second wedge-shaped zones of said intermediate annular space so as to be wedged between the projection on the inlet member and the abutment surface of the intermediate member, each of the first and second wedging bodies constituting a respective one of the above-mentioned drive members; and at least one stationary axial finger which is secured to or integral with the casing and which is disposed in said intermediate annular space, the projection on the inlet member being disposed facing the stationary axial finger when said inlet member is in its rest position; and the drive stage includes at least three pairs of wedging bodies, the first and second wedging bodies of each pair of wedging bodies being disposed on either side of a stationary axial finger and of a projection on the inlet member, the first wedging body of each pair of wedging bodies being held spaced apart from the second wedging body of an adjacent pair of wedging bodies by a compression spring.

Furthermore, the invention also provides a vehicle seat including an adjustment mechanism as defined above. In the seat, the height of a seat proper may be adjustable by a raising device, the adjustment mechanism controlling the raising device.

BRIEF DESCRIPTION OF THE DRAWINGS

Other characteristics and advantages of the invention appear from the following description of two of its embodiments, given by way of non-limiting example, and with reference to the accompanying drawings.

In the drawings.

MORE DETAILED DESCRIPTION

In the various figures, like references are used to designate elements that are identical or similar.

Figure 1:
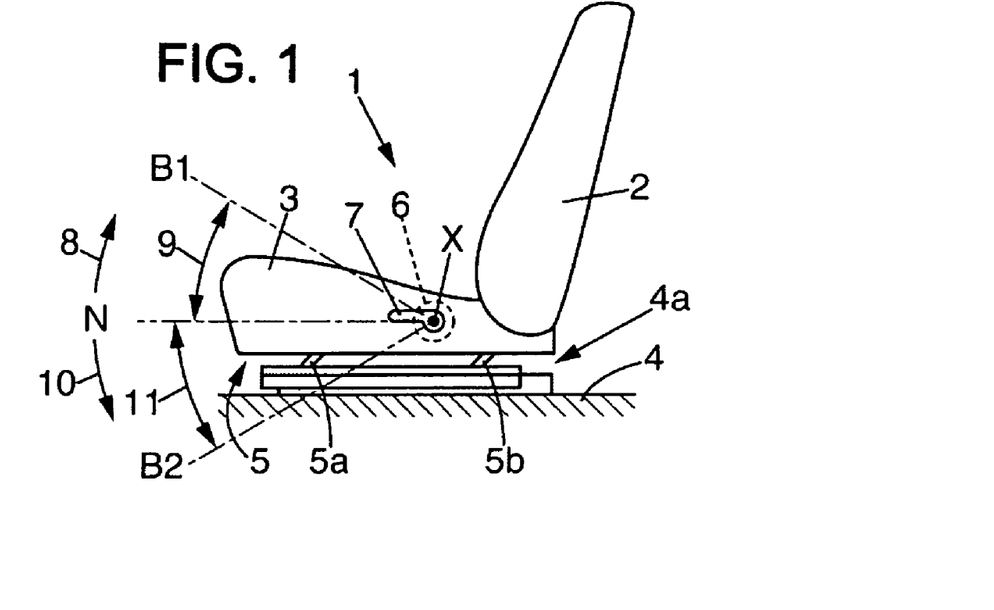
FIG. 1 is a diagrammatic view of a vehicle seat, in which the height of the seat proper is adjustable by means of an adjustment mechanism of the invention.

FIG. 1 shows a vehicle seat 1 which comprises a seat back 2 carried by a seat proper 3 itself mounted on the floor 4 of the vehicle, e.g. by means of longitudinal runners 4a.

The seat proper 3 is connected to the runners 4a via a raising mechanism 5 that is known per se and that can, for example, comprise two raising links 5a, 5b on either side of the seat proper for adjusting the height of said seat proper 3.

The raising mechanism is driven by an adjustment mechanism 6, itself driven by an actuating member such as a control lever 7 or the like mounted to pivot about a transverse horizontal pivot axis X.

The lever 7 is urged resiliently towards a rest position N, in which said lever can, for example, be disposed substantially horizontally. Starting from this rest position, the lever 7 can be moved:

in a first angular direction 8, over a first angular sector 9 defined between the rest position N and a first abutment position B1; and in a second angular direction 10, over a second angular sector 11 defined between the rest position N and a second abutment position B2.

Figure 2:
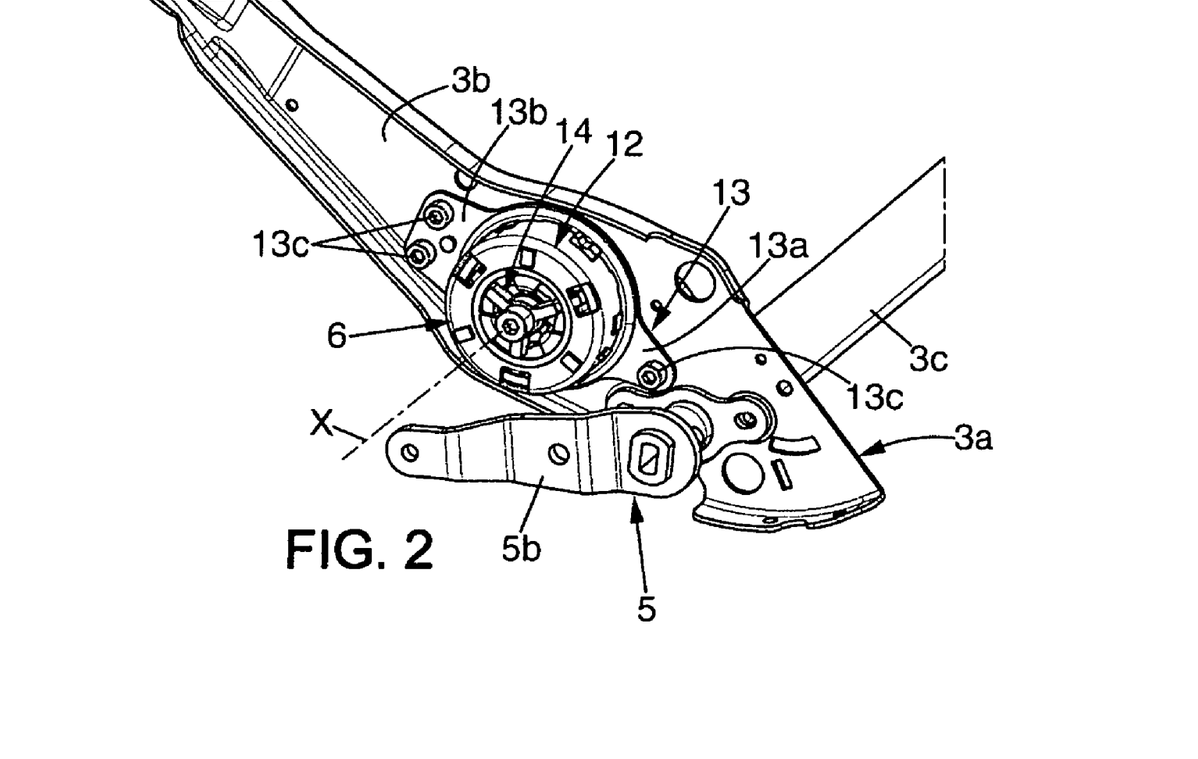
FIGS. 2 and 3 are perspective views of a portion of the seat of FIG. 1, showing how the adjustment mechanism is mounted on one of the cheek plates of the seat proper.
Figure 3:
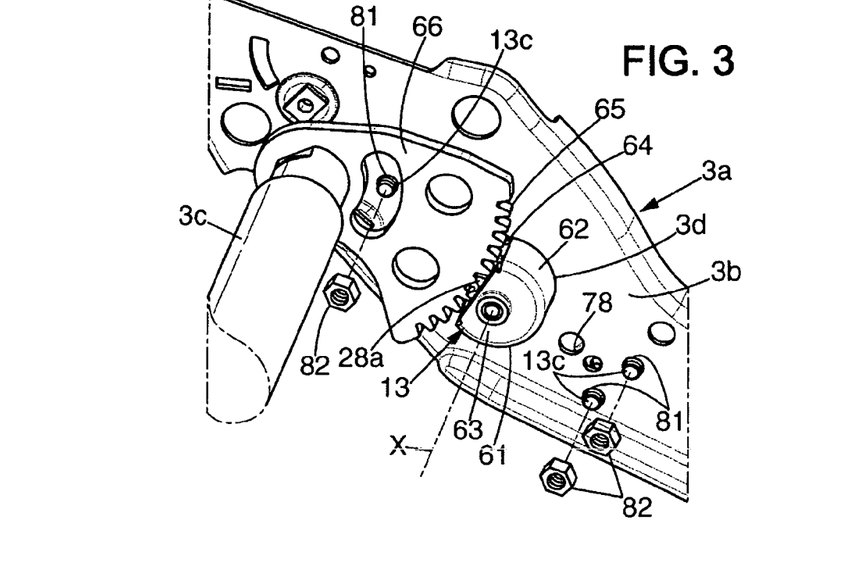

As shown in FIGS. 2 and 3, the adjustment mechanism 6 comprises a mechanical transmission device contained in a casing that is of substantially cylindrical shape, that is centered on the axis X, and that is made up of sheet metal cheek plates 12, 13 respectively constituting a cover 12 and a base 13 that are assembled together.

The casing is fastened to the metal framework 3a of the seat proper, which framework can, for example, comprise two vertical side cheek plates 3b (only one of which is visible in FIGS. 2 and 3) connected together by crosspieces 3c. In the example shown, the crosspieces comprise at least one rear crosspiece 3c which is secured to the rear raising links 5b and which is mounted to pivot therewith on the cheek plates 3b of the seat proper.

More particularly, in the example considered herein, the base 13 of the casing of the adjustment mechanism 6 can, for example, extend substantially perpendicularly to the axis X and can be provided with two fastening tabs 13a, 13b which are fastened to one of the cheek plates 3b by bolts 13c, rivets, or the like. The cover 12 can have an end wall 12a that is substantially perpendicular to the axis X, and a cylindrical side wall 12b that is centered on the axis X, said side wall being extended by catches 12c crimped into slots 13d in the base 13.

Figures 5, 6, 7:
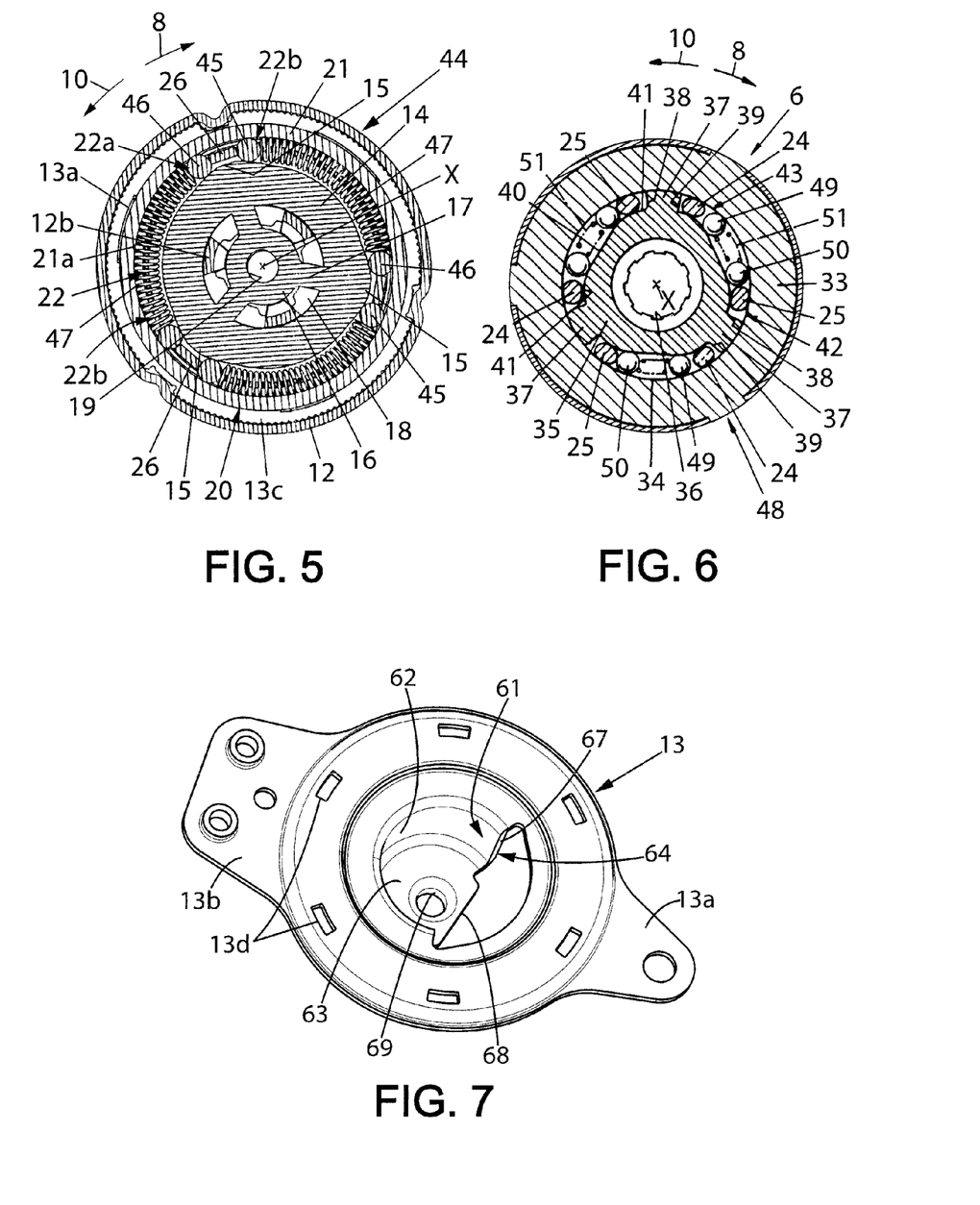
FIGS. 5 and 6 are views in section respectively on line V-V and on line VI-VI of FIG. 4.
FIG. 7 is a perspective view of the base of the adjustment mechanism of FIG. 4.

In addition, the cheek plate 3b is provided with a hole 3d through which a projecting portion 61 of the base 13 extends. As shown in FIGS. 3 and 7, said projecting portion 61 can, for example, be formed by a stamped-out dished portion provided in the base 13, and can have a side wall 62 that is substantially parallel to the axis X and an end wall 63 that is substantially perpendicular to the axis X. The side wall 62 is circularly cylindrical in overall shape, centered on the axis X, and interrupted over a certain angular sector in order to form a side opening 64. The opening 64 is disposed facing the circular set of teeth 28a on an outlet sprocket 28 of the adjustment mechanism. The set of teeth 28a can thus come into engagement with a circularly arcuate set of teeth 65 belonging to a toothed sector 66 secured to the above-mentioned link 5b, so as to cause said link 5b to pivot in order to adjust the height of the seat proper 3.

In the example shown in FIGS. 2 to 7, the sprocket 28 projects laterally out from the opening 64 which opening is defined by:
- two axial edges 67 of the side wall 62; and
- a rectilinear edge 68 of the end wall 63, which edge interconnects the two axial edges 67.

In this embodiment, the axial wall 63 does not therefore project above the set of teeth 28a of the sprocket and above the set of teeth 65 of the toothed sector 66.

Figure 4:
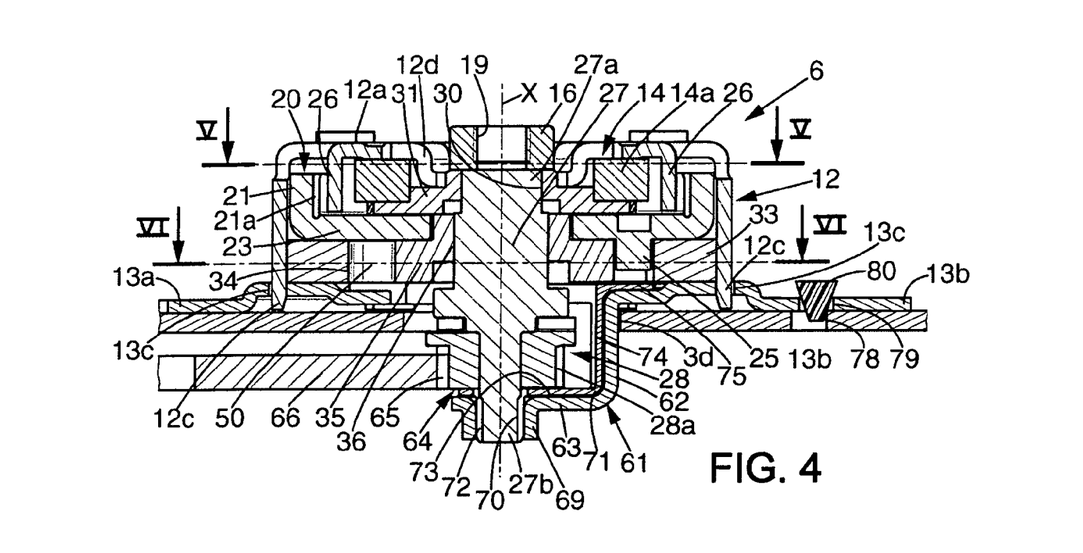
FIG. 4 is a view in axial section through the adjustment mechanism of FIGS. 2 and 3.

As shown in FIGS. 4 to 6, the adjustment mechanism 6 further comprises an inlet member 14 which can be a metal annular inlet cam whose outside shape is substantially triangular with rounded vertices constituting three projections 15 projecting radially outwards (see FIG. 5).

The inlet member 14 comprises a peripheral ring 14a which includes the projections 15 and which is connected to a central portion 16, centered on the axis X, via three bridges 17 separated angularly from one another by three recesses 18. The central portion 16 of the inlet member 14 is provided with a tapped hole 19 which makes it possible to fasten the above-mentioned lever 7. Catches 12d belonging to the cover 12 can penetrate into said recesses.

In addition, the adjustment mechanism 6 further comprises a metal intermediate member 20 which is mounted to pivot about the axis X and which comprises a ring 21 centered on the pivot axis X (FIGS. 4 and 5). This ring 21 has an inside cylindrical surface or abutment cylindrical surface 21a that is circularly symmetrical about the axis X, and said ring 21 is disposed around the ring 14a of the inlet member.

Together with the inlet member 14, the abutment cylindrical surface 21a radially defines a hollow intermediate space 22 (see FIG.5) which, on either side of each projection 15 on the inlet member, forms first and second wedge-shaped zones 22a, 22b that diverge in respective ones of the first and second directions 8, 10.

The intermediate member 20 further comprises a base 23 formed integrally with the ring 21 on the side opposite from the cover 12, said base 23 further being provided with three pairs of axial fingers 24, 25 (FIGS.4 5 and 6). Each of said pairs of axial fingers comprises first and second axial fingers 24, 25 that extend towards the base 13 of the casing parallel to the axis X.

In the intermediate annular space 22, three axial fingers 26 are disposed that may be constituted in particular by tongues cut out from the cover 12 of the casing and folded back axially towards the inside of said casing. When the mechanism 6 is in the rest position, the projections 15 of the inlet member 14 are disposed in register with respective ones of the three stationary axial fingers 26.

Furthermore, as shown in FIGS. 4 and 6, the adjustment mechanism 6 further comprises a thick metal ring 33 secured to the base 13, which ring is interposed axially between the base 13 of the casing and the intermediate member 20. This ring 33 has an annular shape centered on the axis X, and it has an inside cylindrical surface 34 or "blocking"cylindrical surface that is circularly symmetrical about said axis X.

Inside the stationary ring 33, an outlet cam 35 is disposed that is internally provided with a fluted hole 36 or the like in which a shaft 27 carrying the above-mentioned sprocket 28 is forced fitted.

As shown in FIG. 6, the outlet cam 35 is externally provided with three radial fingers 37 which project outwards until they come into contact with the blocking cylindrical surface 34 and which are angularly spaced apart at 120° from one another.

Each finger 37 is defined laterally by first and second thrust faces 38, 39 which face respectively in the second angular direction 10 and in the first angular direction 8.

The periphery of the outlet cam 35 is also provided with three setback zones, each of which has a central flat 40 which, in the vicinity of the two adjacent projecting fingers 37, is extended by two rounded zones 41 having circularly arcuate shapes substantially centered on the axis X. Together with the blocking cylindrical surface 34, each flat 40 defines first and second wedge-shaped spaces 42, 43 that diverge respectively in the first angular direction 8 and in the second angular direction 10.

The above-mentioned shaft 27 which carries the outlet cam 35, is mounted to pivot about the axis X on two bearings:
- a first bearing formed, in this example, by a guide ring 31 that is made of plastic or of some other material, that is substantially circularly cylindrical about the axis X, and that is engaged by force between the catches 12d of the cover 12 of the casing so as to be secured to said casing, the guide ring 31 receiving a cylindrical bearing surface 30 formed at an end 27a of the shaft 27 that is situated opposite from the sprocket 28; and
- a second bearing 69 formed, for example, by a cylindrical wall 69 formed at the center of the end wall 63 of the base 13, said cylindrical wall receiving a cylindrical bearing surface 70 formed at that end 27b of the shaft 27 which is situated opposite from the end 27a.

A cylindrical wall of a lining part 71 can optionally be interposed in the cylindrical space 72 between the cylindrical wall 69 and the bearing surface 70 of the shaft 27 (see FIG. 4). The lining part 71 can be made of metal or of a plastics material, and can, for example, have:
- an end wall 73 internally covering the end wall 63 of the base 13;
- a side wall 74 internally covering the side wall 62 of the base 13; and
- a collar 75 projecting radially outwards and interposed between the base 13 and, in particular, the cam 35. The lining part 71 can make it possible, in particular, to reinforce the stamped-out dished portion 61.

The above-described mechanism 6 operates by means of the following:
- a drive stage 44 (FIG. 5) which connects the inlet cam 14 to the intermediate member 20; and
- a locking stage 48 (FIG. 6) which connects the intermediate member 20 to the outlet cam 35.

As shown in FIG. 5, the drive stage 44 includes three pairs of first and second rigid wedging bodies 45, 46 which, in this example, are steel balls or rollers, disposed in respective ones of the intermediate annular spaces 22 in the first and second wedge-shaped zones 22a, 22b that are situated on either side of each projection 15 on the inlet member 14.

A compression spring 47 is interposed between each first wedging body 45 and the second wedging body 46 corresponding to the adjacent projection 15 on the inlet member, the compression spring also being received in the intermediate annular space 22, so as to urge the wedging body towards the wedge-shaped zones 22a, 22b.

Thus, when the actuating lever 7 is moved in either of the angular directions 8, 10 away from its rest position N, the projections 15 on the inlet body 14 block the first wedging bodies 45 hard against the abutment surface 21a when the lever is actuated in the first angular direction 8, and they block the second wedging bodies 46 against the abutment surface 21a when the lever is actuated in the second angular direction 10. The inlet member 14 then drives the intermediate member 20, after the lever 7 has traveled with a very small amount of angular lost motion, which lost motion can be about 1°. During this movement, every other wedging body remains in abutment against the stationary fingers 26.

When the user releases the lever 7 after each occasion on which it is actuated, said lever is returned to the rest position N by means of the springs 47 of the drive stage. During this return movement back towards the rest position, the wedging bodies 45, 46 that have been displaced by the inlet cam 14 return towards their initial positions with said inlet cam, while rubbing against the inside surface 21a of the ring 21. However, this rubbing does not induce any movement of the intermediate member 20 because of the presence of an elastomer ring (not shown).

It should be noted that the above-described drive stage could optionally be replaced by a ratchet drive mechanism, or by any other mechanism operating by back and forth motion of the lever 7.

Furthermore, as shown in FIG. 6, the locking stage 48 includes three pairs of first and second clamping bodies 49, 50 (e.g. steel balls or rollers) which are disposed in respective ones of the first and second wedge-shaped spaces 42, 43, and which are urged apart by compression springs 51 so that, in the rest position, the clamping bodies 49, 50 hold the outlet member 35 stationary by wedging against the blocking surface 34.

In addition, the first and second clamping bodies 49, 50 of each pair of clamping bodies that is disposed between two radial fingers 37 of the outlet cam are flanked by a pair of first and second axial fingers 24, 25 of the intermediate member 20, with some angular clearance.

More precisely:

each first axial finger 24 is disposed between one of the first clamping bodies 49 and the corresponding second thrust face 39, said first finger 24 having a first abutment face adapted to move the corresponding first clamping body; and each second axial finger 25 is disposed between one of the second clamping bodies 50, and the corresponding first thrust face 38, said second finger 25 having a second abutment face adapted to move the corresponding second clamping body.

When the lever 7 is actuated by a user, and when it causes the intermediate member 20 to pivot as explained above, e.g. in the second angular direction 10 from its rest position N (i.e. over the second angular sector 11), the abutment face of each finger 25 of the intermediate member 20 moves the corresponding second clamping body 50 in the second angular direction 10, thereby releasing the second clamping body.

After the second clamping bodies 50 have been released, the first clamping bodies 49 urge the outlet member 35 in the angular direction 10 under the effect of the springs 51.

This urging can be sufficient to turn the outlet member 35, in particular when the mechanism 6 is operating empty, i.e. without being subjected to any opposing torque.

Conversely, when the mechanism 6 is operating under a load, the intermediate member 20 pivoting causes the outlet member 35 to turn in the angular direction 10 only when the first axial fingers 24 of the intermediate member 20 come into contact with the second thrust faces 39 of the outlet member.

At the end of actuation of the lever 7, when said lever returns towards its rest position N, the intermediate member 20 remains stationary as explained above, so that the outlet member 35 and the coupling shaft 27 remain stationary. If the user effects several "pumping" movements over the second angular sector 11, the outlet member 35 and the coupling shaft 27 are thus turned a plurality of times successively in the same angular direction 10.

The device would operate in the same way, mutatis mutandis, if the lever 7 were actuated repeatedly over the first angular sector 9.

As shown in FIG. 4, while the adjustment mechanism 6 is being mounted on the cheek plate 3b of the seat proper, it is possible to move the casing 12, 13 of the hinge mechanism to a small extent laterally, so as to procure full meshing between the teeth of the sprocket 28 and the teeth of the toothed sector 66. To this end, it is possible to provide, e.g. in the catch 13b of the base 13, a hole 79 that is disposed facing a hole 78 in the cheek plate 3b, the hole 79 however being off-center to a small extent relative to the hole 78 in the direction opposite from the toothed sector 66.

A conical key 80 or the like, made, for example, of a plastics material, or optionally of metal, is engaged in the holes 79, 78. In the example considered herein, said key is engaged firstly in the hole 79, then it penetrates into the hole 78 while coming into abutment against that portion of the edge of the hole 78 which is situated opposite from the toothed sector 66. During this engagement, the entire casing 12, 13 is thus moved towards the toothed sector 66 while procuring the above-mentioned full engagement of the teeth, by taking up slack.

As can be seen in FIG. 3, the bolts 13c of the base 13 are engaged with clearance in the holes 81 in the cheek plate 3b and the projecting portion 61 on the base 13 is engaged with clearance in the corresponding hole 3d in the cheek plate 3b, so that said bolts 13c do not interfere with the movement generated by the key 80. Once the nuts 82 have been tightened onto the bolts 13c, the casing 12, 13 is held stationary relative to the cheek plate 3b.

It should be noted that, since the sprocket 28 is flanked by two bearing 35, 69, the slight stressing generated by the key 80 does not move the shaft 27 out of alignment and thus does not give rise to any malfunctioning of the adjustment mechanism 6.

Figure 8:
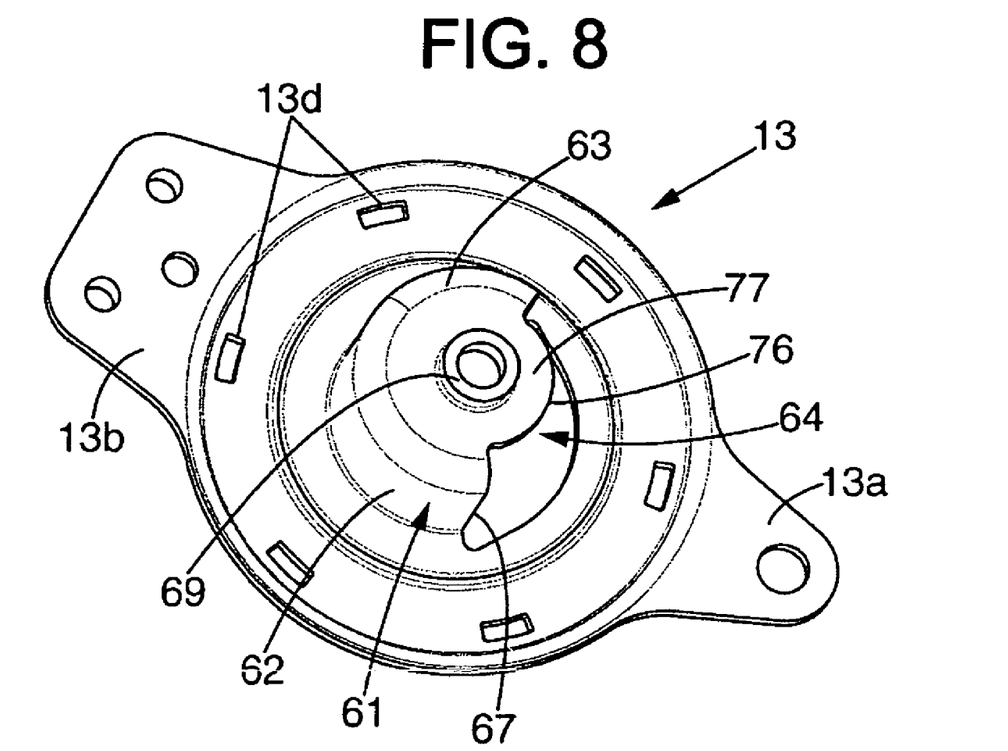
FIG. 8 is a perspective view of the base of the adjustment mechanism in a second embodiment of the invention, the base being seen looking in the opposite direction relative to FIG. 7.

The second embodiment of the invention, corresponding to FIG. 8, differs from the above-mentioned first embodiment only by the fact that the base 13 of the casing has a disk-shaped end wall 63 having a circularly arcuate edge 76 that interconnects the two axial edges 67 of the opening 64, so that the end wall 63 has a projecting portion 77 which covers the set of teeth 28a on the outlet sprocket in the axial direction at the side opening 64. This projecting portion 77 also covers that portion of the set of teeth 65 which is being meshed with the set of teeth 28a, so that said projecting portion 77 contributes to preventing the toothed sector 66 from disengaging from the outlet sprocket 28, in particular when the vehicle in which the seat is mounted suffers an accident.

It should be noted that the projecting portion 77 of the end wall 63 could have an edge 76 otherwise than circularly arcuate, provided that said projecting portion covers at least a portion of the set of teeth 28a of the outlet sprocket and of the set of teeth 65 of the toothed sector 66.

What is claimed is:

1. A vehicle seat including:
  a seat proper having at least one metal cheek plate provided with a hole,
  an adjustable mechanism comprising:
  a casing fixed to said cheek plate;
  an inlet member that is moveable relative to the casing;
  an outlet sprocket provided with a circular set of teeth and mounted to pivot in first and second bearings that are secured to or integral with the casing, said outlet sprocket being connected to the inlet member via a transmission device contained in the casing;

wherein the outlet sprocket is axially interposed between the first and second bearings;

wherein the casing is provided with at least one side opening facing the set of teeth on the outlet sprocket, said outlet sprocket meshing with an external member in order to drive said external member through said side opening;

and wherein the casing includes a base provided with a stamped-out dished portion in which the set of teeth of the sprocket is received, said base being provided with said side opening and said stamped-out dished portion of the base projecting through said hole of the cheek plate.

2. A vehicle seat according to claim 1, wherein the stamped-out dished portion of the base has a side wall that is substantially parallel to the pivot axis and an end wall substantially perpendicular to the pivot axis, said side opening being provided in the side wall.

3. A vehicle seat according to claim 2, in which the set of teeth of the outlet sprocket project laterally out of said side wall via said side opening and the end wall covers the set of teeth of the outlet sprocket at least in part in the axial direction at said side opening.

4. A vehicle seat according to claim 2, in which the second bearing comprises a cylindrical wall formed in the end wall of the stamped-out dished portion.

5. A vehicle seat according to claim 2, in which the stamped-out dished portion is internally covered at least in part by a lining part.

6. A vehicle seat according to claim 1, in which the casing includes a cover fastened to the base, and the first bearing comprises a ring secured to or integral with the cover.

7. A vehicle seat according to claim 1, in which the inlet member is mounted to pivot relative to the casing about a pivot axis, said inlet member being urged resiliently towards a rest position and being moveable in a first direction from the rest position, over a first angular sector, and in a second direction opposite from the first direction from the rest position, over a second angular sector, and the adjustment mechanism further comprises:

an intermediate member mounted to pivot about the pivot axis;

a drive stage connecting the inlet member to the intermediate member and adapted for:

positively driving the intermediate member with the inlet member via at least one drive member when the inlet member is moved away from the rest position; and moving the drive member with the inlet member when said inlet member is returned to its rest position with the drive member rubbing against the intermediate member;

a blocking surface which is integral with or secured to the casing and which is circularly symmetrical about the pivot axis;

an outlet cam which is secured to the outlet sprocket and which is shaped to co-operate with the blocking surface to define at least one pair of wedge-shaped spaces comprising first and second hollow wedge-shaped spaces, the first and second wedge-shaped spaces diverging respectively in the first angular direction and in the second angular direction; and a locking stage connecting the intermediate member to the outlet cam, said locking stage comprising:

at least one pair of clamping bodies comprising first and second rigid clamping bodies which are disposed in respective ones of the first and second wedge-shaped spaces and which are resiliently urged in respective ones of the first and second angular directions so as to become wedged between the outlet cam and the blocking surface;

at least first and second rigid abutment faces secured to or integral with the intermediate member and which face in respective ones of the first and second angular directions, the first abutment face being adapted to abut against the first clamping body while releasing it when the intermediate member turns in the first angular direction, and the second abutment face being adapted to abut against the second clamping body while releasing it when the intermediate member turns in the second angular direction, the first and second abutment faces having a certain amount of angular clearance relative to the first and second clamping bodies; and at least first and second thrust faces which are secured to or integral with the outlet cam, the first thrust face being adapted to limit the relative movement of the intermediate member relative to the outlet cam in the first angular direction after said first abutment face has moved the first clamping body far enough to release it, so as then to cause said outlet cam to be driven by the intermediate member, and the second thrust face being adapted to limit the relative movement of the intermediate member relative to the outlet cam in the second angular direction after said second abutment face has moved the second clamping body far enough to release it, so as then to cause said outlet cam to be driven by the intermediate member.

8. A vehicle seat according to claim 7, in which the first and second clamping bodies of each pair of clamping bodies are urged apart by a compression spring and they are flanked by a pair of axial fingers comprising first and second axial fingers that are secured to or integral with the intermediate member, the first and second axial fingers having respective ones of the first and second abutment faces, the first thrust face of the outlet member being adapted to abut against the second axial finger of the intermediate member when said intermediate member moves in the first angular direction, and the second thrust face of the outlet member being adapted to abut against the first axial finger of the intermediate member when said intermediate member moves in the second angular direction.

9. A vehicle seat according to claim 7, in which the drive stage comprises:

an abutment surface that is secured to or integral with the intermediate member, which abutment surface is circularly symmetrical about the pivot axis and, together with the inlet member, radially defines a hollow intermediate annular space, the inlet member being provided with at least one projection which projects into said intermediate annular space and which defines first and second wedge-shaped zones in said intermediate annular space, said first and second wedge-shaped zones diverging in respective ones of the first and second angular directions;

a pair of wedging bodies comprising first and second rigid wedging bodies which are disposed in the intermediate annular space and which are urged resiliently towards the first and second wedge-shaped zones of said intermediate annular space so as to be wedged between the projection on the inlet member and the abutment surface of the intermediate member, each of the first and second wedging bodies constituting a respective one of the above-mentioned drive members; and at least one stationary axial finger which is secured to or integral with the casing and which is disposed in said intermediate annular space, the projection on the inlet member being disposed facing the stationary axial finger when said inlet member is in its rest position.

10. A vehicle seat according to claim 9, in which the drive stage includes at least three pairs of wedging bodies, the first and second wedging bodies of each pair of wedging bodies being disposed on either side of a stationary axial finger and of a projection on the inlet member, the first wedging body of each pair of wedging bodies being held spaced apart from the second wedging body of an adjacent pair of wedging bodies by a compression spring.

11. A vehicle seat according to claim 1, in which the height of a the seat proper is adjustable by a raising device, the adjustment mechanism controlling the raising device.

12. A vehicle seat according to claim 1, including a support on which the casing is fastened and a toothed member which meshes with the outlet sprocket, the outlet sprocket and the toothed member being urged together by a slack-takeup device which guarantees that the teeth of the outlet sprocket and of the toothed member mesh fully.

* * * * *